United States Patent Office 3,799,895
Patented Mar. 26, 1974

---

3,799,895
HALOCYANOALKYL EPOXY ETHERS AND POLYMERS THEREOF
Stephen E. Cantor, Cheshire, Conn., assignor to Uniroyal, Inc., New York, N.Y.
No Drawing. Filed Feb. 18, 1972, Ser. No. 227,648
Int. Cl. C08g 23/02, 23/20
U.S. Cl. 260—2 A  10 Claims

ABSTRACT OF THE DISCLOSURE

Halocyanoalkyl epoxy ethers of the General Formula I:

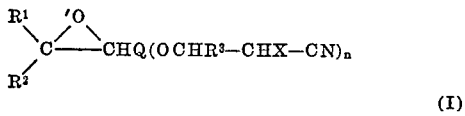

(I)

are disclosed, together with homopolymers and copolymers (including terpolymers) thereof. The polymers are highly oil-resistant, have improved flame-resistance, and can be vulcanized through the pendant halogen group.

---

This invention relates to halocyanoalkyl epoxy ethers, homopolymers and copolymers (including terpolymers) thereof.

U.S. Pat. 3,410,810 discloses certain cyanoalkyl epoxy ethers, and homopolymers and copolymers thereof.

Belgian Pat. 669,537 also discloses making polymers from a broadly-defined group of oxirane compounds containing nitrile groups.

In accordance with this invention, new polymerizable monomers are provided having the General Formula I:

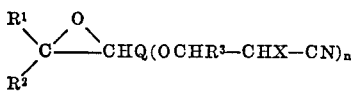

wherein $R^1$ and $R^2$ can be the same or different, and are hydrogen or an alkyl group of 1 to 4 carbon atoms; $R^3$ is hydrogen or an alkyl group of 1 to 3 carbon atoms; Q has a valence of $n+1$, and is an alkyl group of 1 to 4 carbon atoms, a cycloalkyl group of 5 or 6 carbon atoms or phenyl; X is halogen such as fluorine, chlorine, bromine or iodine; and $n$ is an integer of 1 to 3. The preferred compound, (namely, beta-chloro-beta-cyanoethylglycidyl ether, is readily polymerized with or without other copolymerizable monomers, and such polymers have desirably high nitrile and halogen content.

The polymers of the invention have halo and nitrile groups pendant from the polyether backbone, and comprise repeating structural units of the formula:

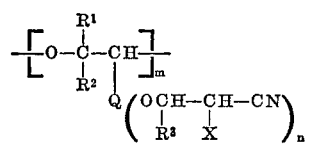

wherein $R^1$, $R^2$, $R^3$, X, Q and $n$ have the values shown above, and $m$ is an integer of 300 to 10,000, or more, and, preferably, 400 to 2,000. Homopolymers contain only this unit; copolymers contain one or more other different units.

The halocyanoalkyl epoxy ethers can also be copolymerized with one or more other epoxy-containing compounds. Copolymers of these ethers with unsaturated alkylene epoxides are sulfur-curable to highly oil-resistant, flame-resistant products, and are especially preferred. Generally, however, suitable copolymerizable comonomers include substituted and unsubstituted alkylene oxides, saturated and unsaturated glycidyl ethers, and glycidyl esters. These comonomers are described more fully in U.S. Pat. 3,410,810, issued Nov. 12, 1968, from column 2, line 5 to column 3, line 10.

The homopolymers of this invention can contain from 300 to 10,000 or more repeating structural units. Copolymers can contain from 1 to about 99 percent by weight of a halocyanoalkyl epoxy ether and, correspondingly, from 99 to 1 percent by weight of at least one copolymerizable alkylene oxide monomer. Preferred copolymers contain 10 to 90 percent by weight of the halocyanoalkyl epoxy ether, and, correspondingly from 90 to 10 percent by weight of the alkylene oxide monomers.

Interpolymers of the new ethers can contain from 10 to 94 percent by weight of the new ethers, from 0 to 84 percent by weight of an alkylene oxide, and from 1 to 16 percent by weight of an unsaturated alkylene oxide. Elastomeric interpolymers of this kind are particularly useful as rubber which is vulcanizable with or without sulfur, and have a good balance of properties: flexibility at extremely low temperatures, aging resistivity, and resistance to swelling in aromatic oils and water. A particularly preferred interpolymer contains chlorocyanoethylglycidyl ether, allyl glycidyl ether, and propylene oxide. The interpolymers can be cured through the pendant chloro groups by employing for instance metal oxides or they may be cured by using sulfur or sulfur-donating curatives utilizing the pendant unsaturation.

The homopolymer and copolymers of this invention can be prepared by reacting these halocyanoalkyl epoxy ethers alone, or with other copolymerizable monomers, preferably in the presence of an inert liquid diluent or solvent, and a catalyst. Polymerization can be carried out in a solution or as a bulk process, and can be either a batch or a continuous process. Suitable inert diluents and solvents for the polymerization in solution include benzene, toluene, chlorobenzene, n-heptane, cyclohexene, methylchloride, chloroform, carbontetrachloride, ethylene dichloride, diethyl ether, dibutyl ether, and the like. Aromatic and aliphatic hydrocarbons containing 6 to 10 carbon atoms are especially useful solvents for the polymerization.

The polymerization can be conducted over a wide range of temperatures and pressures. Polymerization temperatures can range from about 0 to 120° C., preferably from 40 to 60° C. Typically, moderate pressures are used during polymerization, ranging from atmospheric to about 4 atmospheres. It is possible, however, to vary the pressure from sub-atmospheric to 10 or more atmospheres. The time required for polymerization will vary with temperature, pressure, and the nature of the reactants, but typical times range from 6 to 24 hours.

Preferably, a catalyst is used to facilitate the polymerization. Any of the conventional epoxide-polymerizing catalysts such as Lewis acids, tertiary amines, and the like, which are well known to the art, may be used. Organoaluminum catalysts similar to those described in U.S. Pat. 3,219,591 are most useful, as the examples show. These catalysts are prepared by adding an ether to a toluene or heptane solution of an organoaluminum compound maintained at about 0° C., and then adding water and a chelating agent. Suitable organoaluminum compounds include triethylaluminum, triisobutylaluminum, diisobutylaluminumhydride, diethylaluminumchloride, and the like. The chelating agent may be acetylacetone, acetonylacetone, benzoylacetone, acetoacetic acid, ethylacetoacetate, and the like. Preferably, the molar ratios of water to the organoaluminum compound and to the chelating agent will both be in the range from about 0.2:1 to about 1:1. An especially preferred catalyst for the polymerization is triisobutylaluminum/water/acetylacetone prepared with diethyl ether, and in a molar ratio 1.0/0.5/0.5 for triisobutylaluminum, water and acetylacetone respectively.

The amount of catalyst required to polymerize the cyanoalkyl epoxy ethers can be in the range from about 0.1 to about 20 mole percent, based on the monomers, depending on such variables as monomer purity and reactivity. Preferably, the catalyst is present in an amount from about 0.5 to about 7 mole percent based on the monomers. Generally, the catalyst is prepared prior to polymerization, but it may be advantageous to prepare the catalyst in situ. Addition of the catalyst to the polymerization reaction may be in one portion, incremental or continuous.

The monomers and solvents should be essentially pure because greater purity promotes more efficient polymerization. The presence of oxygen, carbon dioxide, alcohols, water, and the like tends to decrease catalyst activity, and should be minimized. Results can be improved where reactants and solvents are distilled, or passed through a suitable desiccant such as molecular sieves prior to use, or both, and conducting the polymerization under an inert (e.g., nitrogen) atmosphere.

The copolymers and terpolymers of the invention can be either random interpolymers or block interpolymers, depending upon the method or order of addition of the reactant monomers.

The homo- and copolymers of the invention process readily, and require no special handling or processing equipment. They can be compounded on rubber mills, in Banbury mixers, and in extruders. They can be mixed or blended with other polymers or polymer blends, with fillers, reinforcing agents, stabilizers, antioxidants, sulfur and other curing agents, accelerators, plasticizers, lubricants, anti-sticking agents, etc. These homopolymers are highly oil-resistant and show improved flame resistance. They do not require an unsaturated co- or termonomer to produce a vulcanizate; instead, they can be vulcanized via the pendant halo function.

The epoxy ethers of this invention can be prepared by reacting a stoichiometric excess of an allylic alcohol with alpha-haloacrylonitrile and derivatives thereof in the presence of an alkaline earth metal to obtain alpha-halo allyloxy alkanoylnitriles. The latter are then reacted with an epoxidizing agent such as peracetic acid, preferably in the presence of an organic solvent for both reactants, to produce the halocyanoalkyl epoxy ethers of the invention. Schematically, these reactions can be represented as follows:

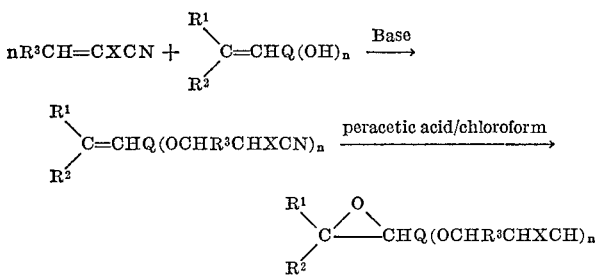

The following examples serve to illustrate the invention more fully. However, they are not intended to limit the scope of the invention. All parts and percentages are by weight unless otherwise indicated.

EXAMPLE 1

Preparation of 2-chloro-3-allyloxypropionitrile

Into a one liter, three-neck flask, fitted with a dropping funnel, a Trubore stirrer and a nitrogen inlet tube, were placed 87.5 grams (one mole) of alpha-chloroacrylonitrile and 232 grams (4 moles) of allyl-alcohol. The contents were stirred and heated to 55° C., then 58 grams (one mole) of allylalcohol, which had been treated with 0.05 gram atom of sodium, was added slowly. A dark color and a mild exotherm developed. After complete addition during a period of one hour, the flask and its contents were stirred at room temperature overnight. Solid carbon dioxide was then added, and the dark solution was vacuum distilled to remove excess allyl alcohol. The product, 2-chloro-3-allyloxypropionitrile in 71 percent yield, had a boiling point of 52 to 53° C. (3 millimeters Hg) and a refractive index ($N_D^{20}$) of 1.4513. The following analysis was performed with the results shown:

Analysis for $C_6H_8NOCl$ molecular weight (MW) 145.6

Calculated

C (carbon) _____ 49.49
H (hydrogen) _____ 5.53
N (nitrogen) _____ 9.61
Cl (chlorine) _____ 24.35

Found

C _____ 50.14
H _____ 5.42
N _____ 9.52
Cl _____ 23.25

EXAMPLE 2

Preparation of 2-chloro-3-cyanoethyl glycidyl ether (Cl-CEGE)

Into a 1-liter, three-necked flask were placed 50 grams (0.34 mole) of 2-chloro-3-allyloxypropionitrile and 100 milliliters (ml.) of chloroform. The solution was stirred and cooled with an ice bath to 5° C., then a chilled mixture of 98 grams of 40 percent peracetic acid, 2.5 grams of sodium carbonate, and 50 ml. of chloroform was slowly added. The reaction mixture was stirred at room temperature for 18 hours, then a large quantity of solid sodium carbonate was added. The chloroform layer was separated, washed and dried. Removal of the chloroform, followed by vacuum distillation, produced two major fractions. The first was unreacted starting material; the second, the higher boiling fraction (boiling point 97–98° C. at 3 mm. Hg) was the desired epoxide. The following analysis was performed with the results shown:

Analysis for $C_6H_8NO_2Cl$; Molecular weight (MW) 161.

Calculated

Carbon (C) _____ 44.59
Hydrogen (H) _____ 4.98
Nitrogen (N) _____ 8.68
Chlorine (Cl) _____ 21.93
Percent epoxide _____ 9.90

Found

C _____ 44.74
H _____ 5.23
N _____ 8.59
Cl _____ 21.52
Percent epoxide _____ 9.70

EXAMPLE 3

Homopolymerization of Cl-CEGE

An eight-ounce bottle was charged with 160 ml. (0.1 mole) of a catalyst solution, 250 ml. of dry n-hexane, and 51 grams (0.31 mole) of Cl-CEGE. The bottle was tumbled for 19 hours at 50° C. The resulting polymer precipitated from the n-hexane, and coated the walls of the bottle. After drying at 50° C. in a vacuum oven, 45 grams (89% yield) of a tough, snappy elastomer were obtained.

The catalyst solution employed was prepared by treating a chilled, 400 ml. solution of 20 percent by weight of triisobutyl aluminum in hexane with 100 ml. of anhydrous diethyl ether. Thereafter, 3.72 grams of water was slowly added while stirring the solution under a nitrogen stream. Finally 21.6 grams of acetylacetone was added at 5° C. The catalyst solution was aged at room temperature for about 24 hours.

The monomers used in the polymerization had previously been distilled under nitrogen, and over calcium hydride, and were added to a dry, nitrogen flushed bottle. Then the catalyst solution and solvent were charged.

EXAMPLE 4

Copolymerization of propylene oxide and Cl-CEGE

Propylene oxide and Cl-CEGE were copolymerized using the catalyst system of Example 3. Thus 220 ml. of catalyst solution, 400 ml. of n-hexane, and 100 grams of a 1:1 weight percent mixture of propylene oxide and Cl-CEGE were added to a polymerization bottle under nitrogen. The bottle was shaken for 19 hours at 50° C., and the precipitated polymer removed from the walls of the bottle. After drying at 50° C. for 18 hours, 80 grams of the elastomer were obtained having a nitrogen content of 4.26 percent as determined by Kjeldahl analysis, representing a composition of 49 percent of Cl-CEGE and 51 percent propylene oxide.

EXAMPLE 5

Terpolymerization of Cl-CEGE, allyl glycidyl ether and propylene oxide

A mixture of 34 parts of propylene oxide, 3 parts of allyl glycidyl ether, and 15 parts of Cl-CEGE were added to a bottle together with 160 ml. of the catalyst solution used in Example 2, and 350 ml. of n-hexane. The bottle was tumbled for 21 hours at 50° C., producing a terpolymer in 78 percent yield having a nitrogen content of 2.91 percent which represented a 34 percent amount of Cl-CEGE in the terpolymer.

A similar terpolymerization employing ethylene oxide instead of propylene oxide produced a terpolymer in a 50 percent yield.

EXAMPLE 6

Vulcanization of Cl-CEGE homo- and copolymer

In this example, a homopolymer of beta-chloro-beta-cyanoethyl glycidyl ether (Cl-CEGE) and a binary copolymer of propylene oxide (PO) and Cl-CEGE, containing 60 percent PO and 40% Cl-CEGE by weight, were each vulcanized, using the recipes shown below. After vulcanization the two elastomers were evaluated according to ASTM D412.

|  | Monopolymer | PO/Cl-CEGE 60/40 copolymer |
|---|---|---|
| Elastomer | 37.5 | 37.5 |
| Zinc stearate | 0.375 | 0.365 |
| FEF carbon black | 18.8 | 18.8 |
| Red lead | 1.88 | 1.88 |
| Nickel dibutyl carbamate | 0.375 | 0.375 |
| 2-mercaptoimidazoline | 0.56 | 0.56 |

Vulcanized at 160° C. for 45 minutes

| | | |
|---|---|---|
| 100% modulus, p.s.i. | 920 | 380 |
| 200% modulus, p.s.i. | | 410 |
| 300% modulus, p.s.i. | | |
| Tensile, at break, p.s.i. | 1,240 | 420 |
| Elongation at break, percent | 160 | 210 |
| Hardness, Shore A | 91 | 90 |
| Fuel B,[1] 30% toluene, 70% isooctene (24 hrs. room temp. 72° F.), percent swell | 1.1 | 52 |

[1] ASTM Test No. D-471-59T.

The vulcanized Cl-CEGE homopolymer and copolymer were both strong, snappy elastomers that were highly resistant to swelling in non-polar liquids such as Fuel B after immersion for 24 hours at 22° C. and atmospheric pressure.

EXAMPLE 7

Vulcanization of the terpolymer of Example 5

The terpolymer of Example 5 was vulcanized for 30 minutes at 150° C. using the formula shown below. The vulcanizate had good physical properties and high resistance to swelling in Fuel B after immersion therein for 24 hours at 22° C. at atmospheric pressure.

| | |
|---|---|
| Example 5 elastomer (34% Cl-CEGE) | 37.5 |
| Philblack "O" | 17.2 |
| Zinc oxide | 1.68 |
| Stearic acid | 1.0 |
| Sulfur | 0.68 |
| Curatives: | |
| Tuex® | 0.33 |
| Tellurac | 0.17 |

TUEX is tetramethylthiuramdisulfide.
Tellurac is tellurium diethyldithiocarbamate.

Vulcanized 30 min. at 150° C.

| | |
|---|---|
| 200% modulus, p.s.i. | 1850 |
| 300 modulus, p.s.i. | |
| Tensile at break, p.s.i. | 2180 |
| Elongation at break, percent | 220 |
| Hardness, Shore A | 81 |
| Fuel B,[1] 24 hrs., percent swell | 53 |

[1] ASTM Test No. D-471-59T.

EXAMPLE 8

Comparison of oil resistance of new and known polymers

The following three polymers were immersed in Fuel B: (1) a homopolymer of Cl-CEGE; (2) a homopolymer of epichlorohydrin; and (3) a copolymer containing 94 percent by weight of propylene oxide and 6 percent by weight of allyl glycidyl ether. Each was tested for physical properties and resistance to swelling in Fuel B. The results:

| Elastomer | (1) | (2) | (3) |
|---|---|---|---|
| Modulus, 200% elongation, p.s.i. | | 1,950 | |
| Modulus, 300% elongation, p.s.i. | 1,000 | | |
| Tensile strength, p.s.i. | 1,240 | 2,180 | 1,950 |
| Elongation, percent at break | 160 | 290 | 580 |
| Hardness, Shore A | 91 | 82 | 73 |
| Percent swelling after 24 hours immersion in Fuel B at 22° C. and atmospheric pressure | 1.1 | 23 | 191 |

The results show that the homopolymers of the invention are decidedly more resistant to swelling in non-polar organic liquids than even well-known commercial rubber, like epichlorohydrin rubber, often used where this property is desired.

I claim:

1. A halocyanoalkyl epoxy ether of the General Formula I:

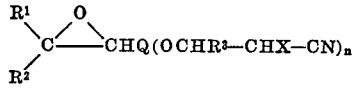

wherein $R^1$ and $R^2$ are the same or different, and are selected from the group consisting of hydrogen and an alkyl group of 1 to 4 carbon atoms; $R^3$ is hydrogen or an alkyl group of 1 to 3 carbon atoms; Q has a valence of $n$ plus 1, and is an aliphatic hydrocarbon group of 1 to 4 carbon atoms, a cycloaliphatic hydrocarbon group of 5 or 6 carbon atoms, or monocyclic aromatic hydrocarbon; X is chlorine, bromine, or iodine; and $n$ is 1, 2, or 3.

2. The epoxy ether of claim 1 wherein X is chlorine.

3. The epoxy ether of claim 2 wherein $n$ is one, Q is $CH_2$, and $R^1$, $R^2$ and $R^3$ are hydrogen.

4. A homopolymer of a halocyanoalkyl epoxy ether containing structural units of the general formula:

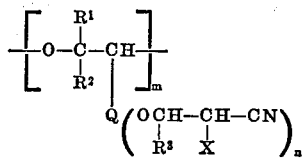

wherein $R^1$ and $R^2$ are the same or different, and are selected from the group consisting of hydrogen and an aliphatic hydrocarbon group of 1 to 3 carbon atoms; Q has a valence of $n$ plus 1, and is an alkyl group of 1 to 4 carbon atoms, a cycloaliphatic hydrocarbon group of 5 to 6 carbon atoms, or monocyclic aromatic hydrocarbon; X is chlorine, bromine or iodine; $m$ is at least 300 and $n$ is 1, 2 or 3.

5. The polymer of claim 4 wherein X is chlorine, $n$ is one, Q is $CH_2$, and $R^1$, $R^2$ and $R^3$ are hydrogen.

6. A copolymer containing the structural units of claim 4, and structural units derived, by ring opening polymerization, from at least one other copolymerizable monomer selected from the group consisting of substituted and unsubstituted alkylene oxides and alkenylene oxides, saturated and unsaturated glycidyl ethers, and saturated and unsaturated glycidyl esters.

7. The copolymer of claim 6 that contains structural units derived from an alkylene oxide.

8. The copolymer of claim 7 that further contains structural units derived from an alkenylene oxide.

9. The copolymer of claim 6 containing units derived from 2-chloro-3-cyanoethyl glycidyl ether and units derived from propylene oxide.

10. The copolymer of claim 9 further containing units derived from allyl glycidyl ether.

References Cited

UNITED STATES PATENTS

| | | |
|---|---|---|
| 3,183,250 | 5/1965 | Rosenblatt et al. ____ 260—348 |
| 3,311,570 | 3/1967 | Vandenberg _____ 260—2 |
| 3,341,491 | 9/1967 | Robinson et al. _____ 260—45.75 |
| 3,410,810 | 11/1968 | Tucker _____ 260—2 |
| 3,449,375 | 6/1969 | Newey _____ 260—348 |

OTHER REFERENCES

Sultanov et al.: Chem. Abstr. 69, 18943u (1968).

WILLIAM H. SHORT, Primary Examiner

E. A. NIELSEN, Assistant Examiner

U.S. Cl. X.R.

260—37 EP, 45.9 P, 79, 380 R, 80.73, 85.5 A, 88.3 A, 348 R, 465.6